United States Patent [19]

Wenstrom et al.

[11] Patent Number: 4,532,677
[45] Date of Patent: Aug. 6, 1985

[54] APPARATUS FOR OPENING AND EVISCERATING SCALLOPS

[75] Inventors: Richard T. Wenstrom, Hampton, Va.; Thomas S. Gorton, Jr., Medford, Mass.

[73] Assignee: Slade Gorton & Co., Inc., Boston, Mass.

[21] Appl. No.: 324,270

[22] Filed: Nov. 23, 1981

Related U.S. Application Data

[60] Continuation of Ser. No. 950,711, Oct. 12, 1978, abandoned, which is a continuation of Ser. No. 225,730, Feb. 14, 1973, abandoned, which is a division of Ser. No. 71,730, Sep. 14, 1970, Pat. No. 3,662,432, which is a division of Ser. No. 659,274, Jul. 17, 1967, Pat. No. 3,528,124, which is a continuation-in-part of Ser. No. 627,470, Mar. 31, 1967, abandoned.

[51] Int. Cl.³ .............................................. A22C 29/00
[52] U.S. Cl. .......................................... 17/74; 17/45
[58] Field of Search ................... 17/53, 72, 73, 74, 51, 17/48

[56] References Cited

U.S. PATENT DOCUMENTS

| 2,102,943 | 12/1937 | Cook | 17/74 |
| 2,337,188 | 12/1943 | Geldermans et al. | 17/48 |
| 2,429,828 | 10/1947 | Lapeyre et al. | 17/73 |
| 2,755,501 | 7/1956 | Samanie | 17/73 |
| 2,832,989 | 5/1958 | Harris | 17/48 |
| 3,203,034 | 8/1965 | Matzer et al. | 17/74 |
| 3,324,504 | 6/1967 | Lapeyre | 17/72 X |
| 3,417,423 | 12/1968 | Meyer | 17/53 |
| 3,562,855 | 2/1971 | Willis | 17/48 |
| 3,621,515 | 11/1971 | Bunnell | 17/53 |
| 3,740,795 | 6/1973 | Cox | 17/53 X |

FOREIGN PATENT DOCUMENTS

| 247915 | 7/1963 | Australia | 17/73 |
| 1454196 | 2/1969 | Fed. Rep. of Germany | 17/53 |

Primary Examiner—Willie G. Abercrombie
Attorney, Agent, or Firm—Cesari and McKenna

[57] ABSTRACT

A method and apparatus for shucking raw uncooked unfrozen shellfish of the bivalve type which includes the method of opening the shells by shocking the shellfish, cleaning the viscers from the edible muscle of the shellfish and the apparatus for opening and cleaning the same.

3 Claims, 13 Drawing Figures

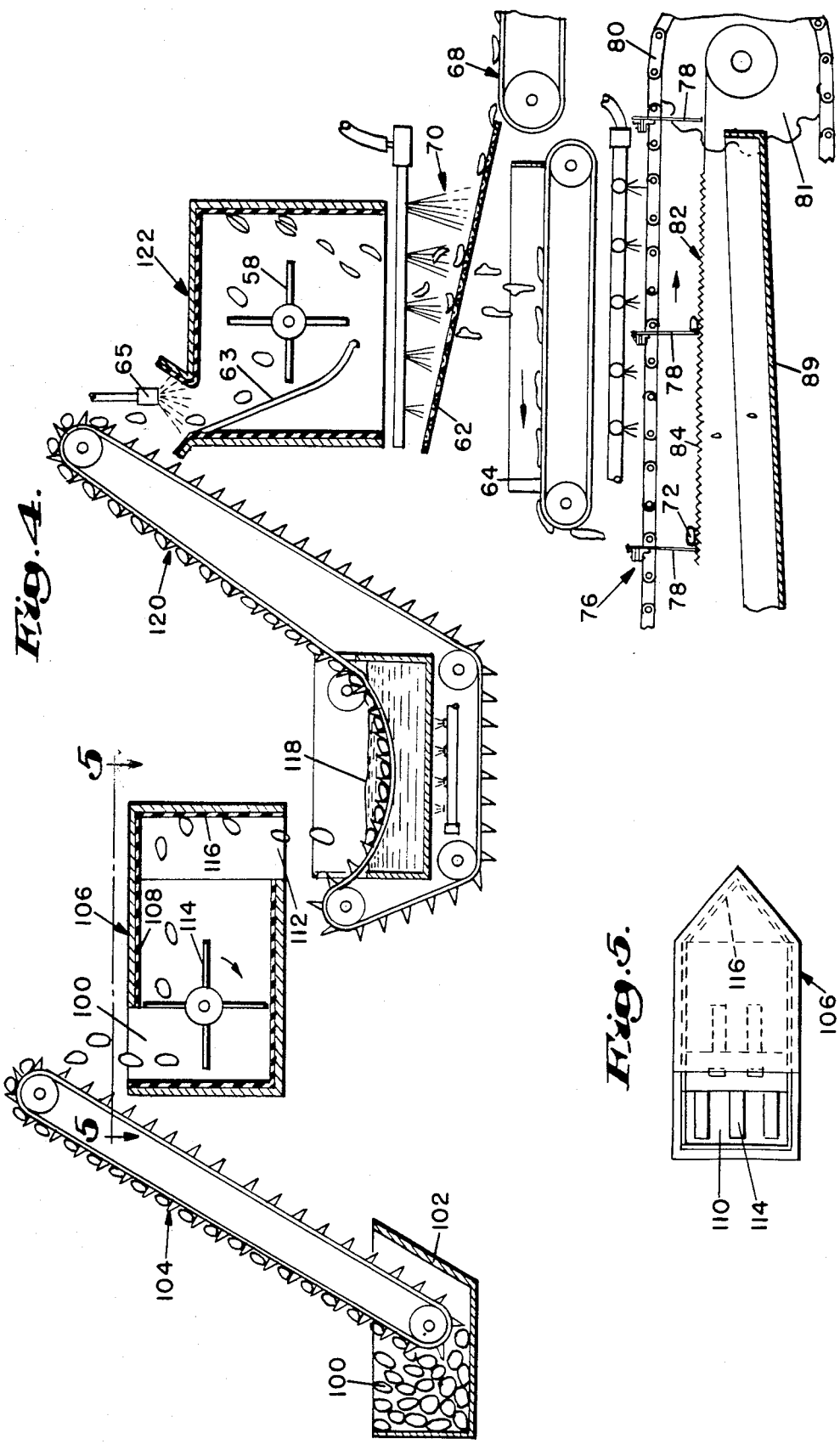

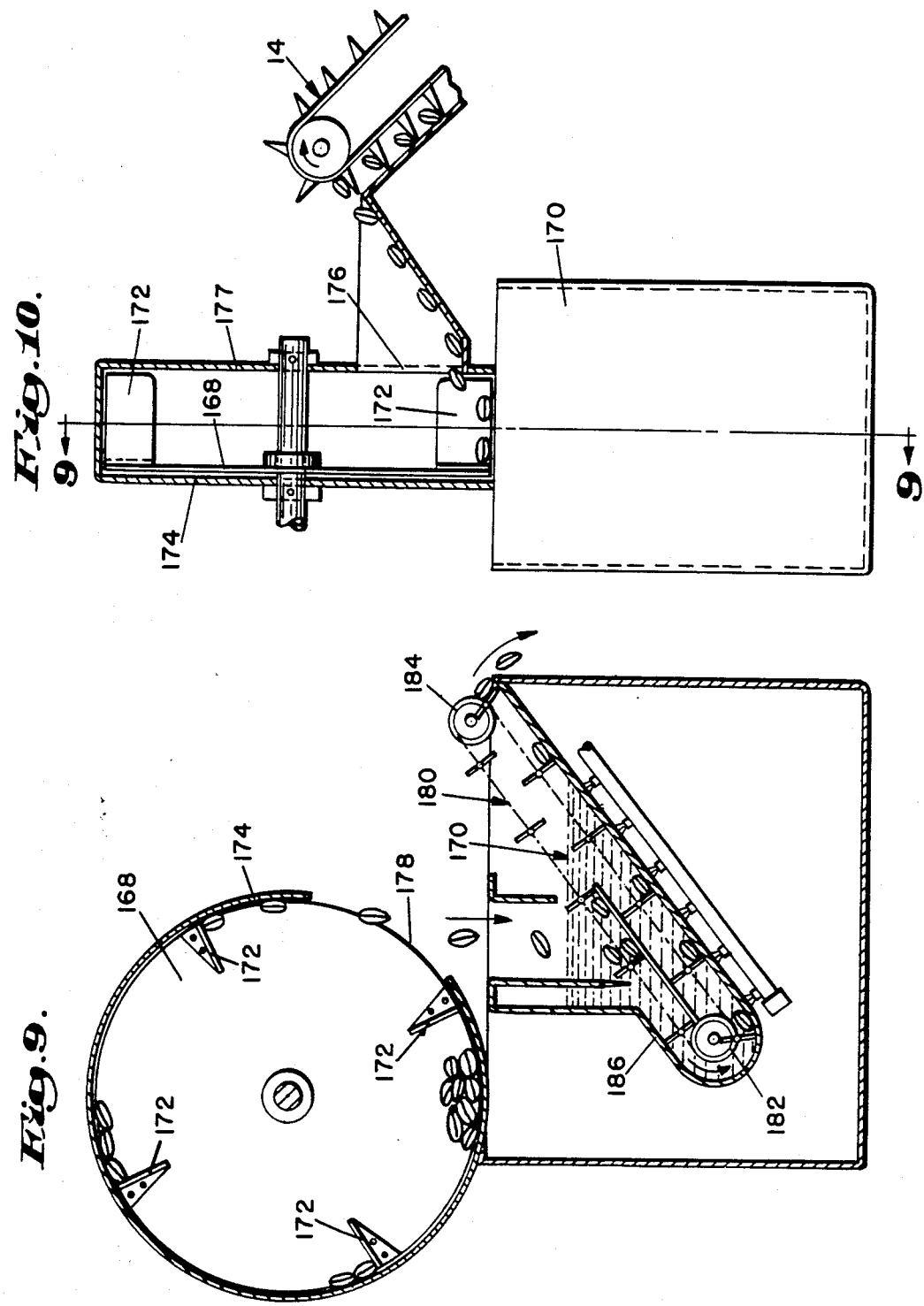

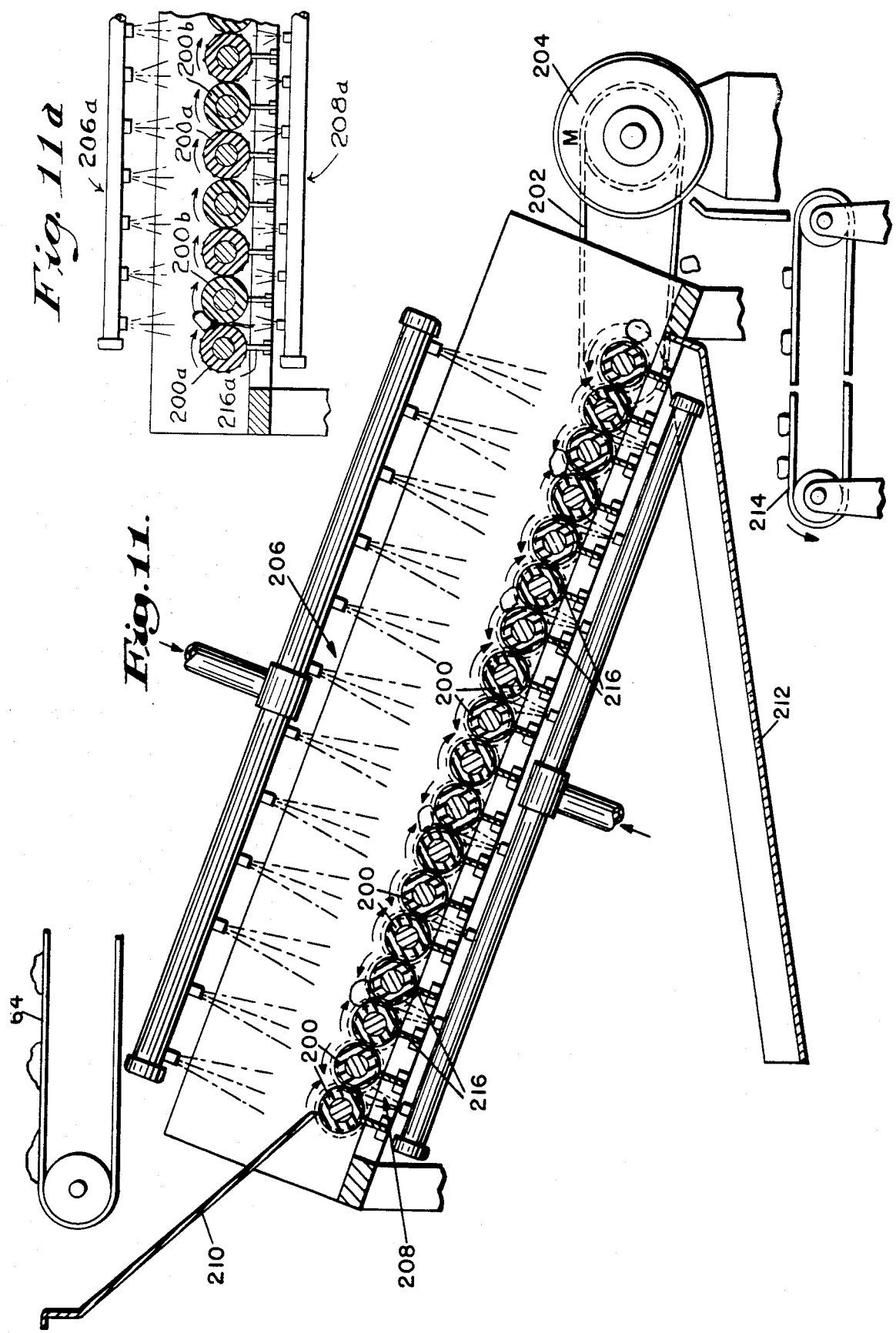

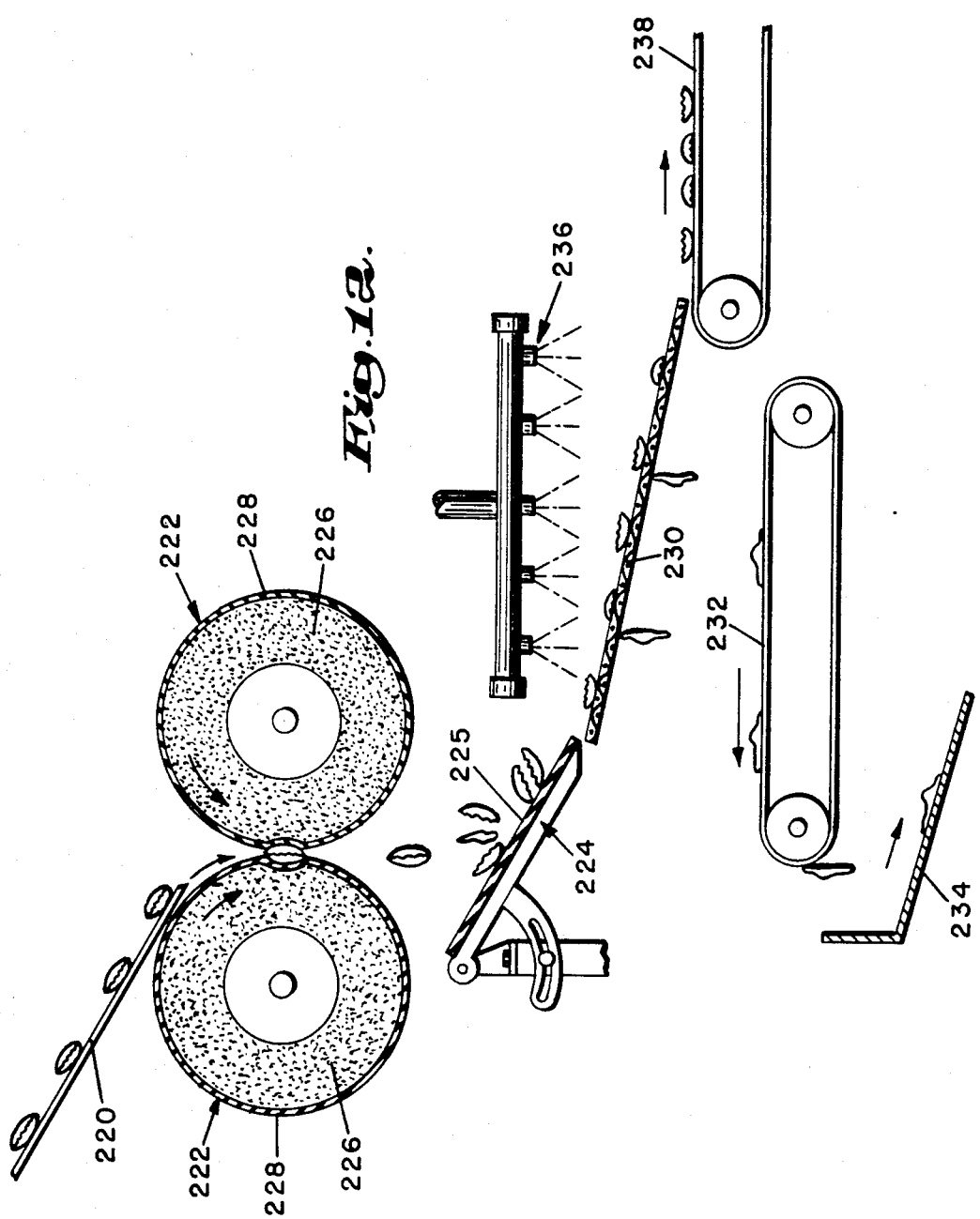

APPARATUS FOR OPENING AND EVISCERATING SCALLOPS

This application is a continuation of U.S. Application Ser. No. 950,711, filed Oct. 12, 1978, and now abandoned. The latter application was a continuation of U.S. Application Ser. No. 225,730, filed Feb. 14, 1973, now abandoned, which was a division of U.S. Application Ser. No. 071,730, Sept. 14, 1970, now U.S. Pat. No. 3,662,432, the latter application being a division of U.S. Application Ser. No. 659,274, filed July 17, 1967, now U.S. Pat. No. 3,528,124, the latter application, in turn, being a continuation-in-part of U.S. Application Ser. No. 627,470, filed Mar. 31, 1967, now abandoned.

This invention relates to a method of and apparatus for shucking shellfish.

The invention has for an object to provide a novel and improved method of shucking shellfish and particularly bivalves whereby to separate the two half shells of the bivalve, to separate the meat from the shells and to remove the viscera from the meat in an economical, rapid and efficient manner.

The invention has for a further object to provide novel and improved apparatus for shucking shellfish of the bivalve type whereby the shells of the bivalve are opened, the contents separated from the shells and the viscera removed from the meat in a rapid and efficient manner whereby the proportion of edible muscle meat produced from the scallops of shellfish is substantially increased.

With these general objects in view and such other as may hereinafter appear, the invention consists in the method of and apparatus for shucking shellfish as hereinafter described and particularly defined in the claims at the end of this specification.

In the drawings illustrating the preferred embodiment of the invention:

FIG. 4 is a side elevation of another modified form of apparatus for shucking shellfish;

FIG. 5 is a plan view as seen from the line 5—5 of FIG. 4;

FIG. 9 is a side elevation of a modified form of apparatus for shucking shellfish in accordance with the present invention as seen from the line 9—9 of FIG. 10;

FIG. 10 is a front view of the apparatus shown in FIG. 9;

FIG. 11 is a side elevation of a modified form of apparatus for eviscerating the scallop meats;

FIG. 11a is a partial view in side elevation of a modified form of the eviscerating apparatus shown in FIG. 11; and FIG. 12 is a side elevation of another modified form of apparatus for shucking shellfish in accordance with the present invention.

Figure 1:
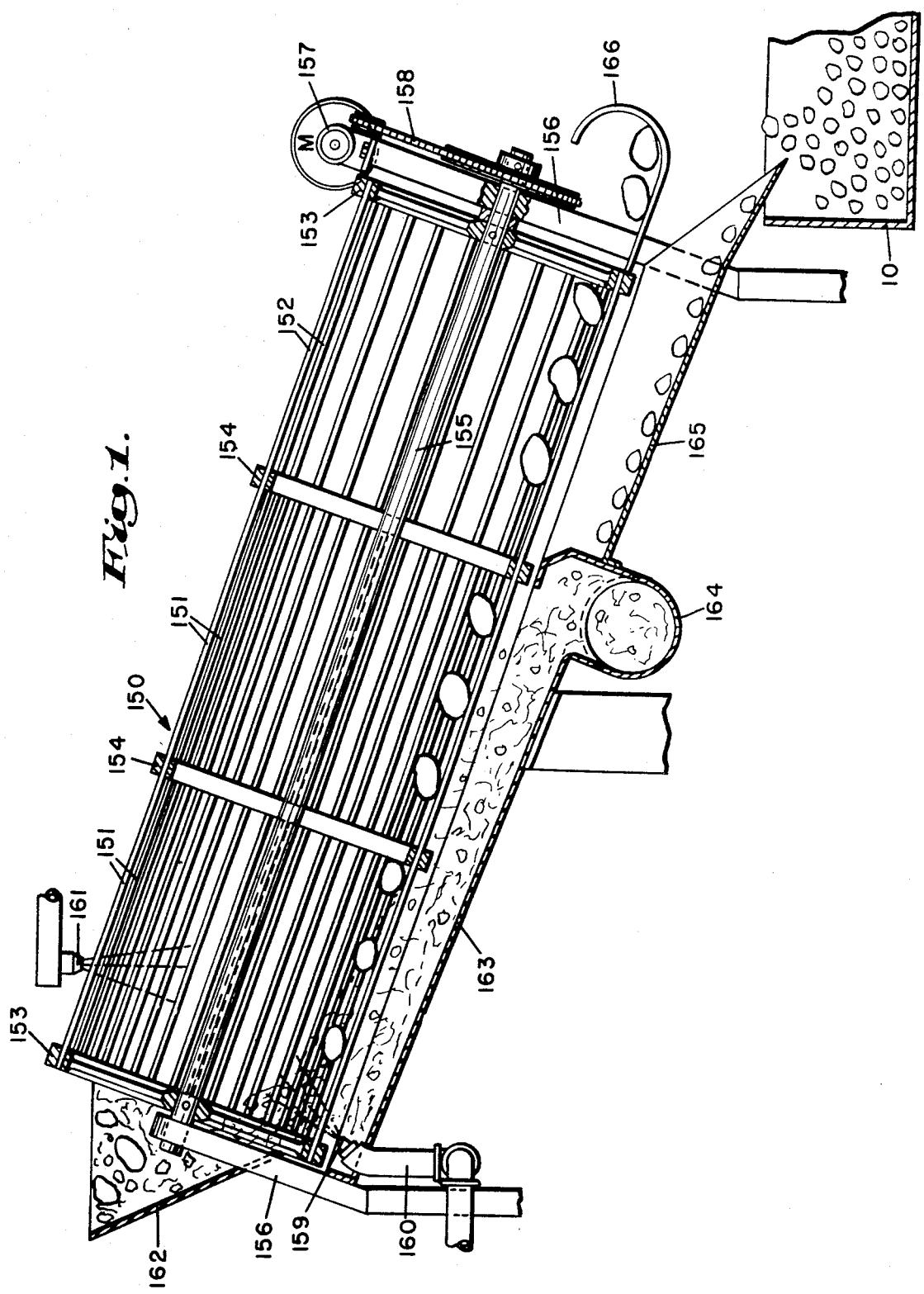
FIG. 1 is a side elevation in cross section of a preliminary cleaning and sorting device.

In general, the present invention contemplates a novel method of and apparatus for shucking shellfish of the mollusk or bivalve type wherein the meats are separated from the two half shells of the bivalve, and the meat together with the viscera is cleanly removed from the shells in a simple, rapid and efficient manner without breaking the shells. Provision is also made for collecting the deshelled scallops which may be conveyed to a discharge point for further processing, and provision is also made for collecting the shells in a separate path and conveying the same to a suitable discharge point. Incidental to the present invention, since unbroken shells have some commerical valve, the present method of shucking shellfish leaves a major portion of the shells or shucks whole. Provision is also made for eviscerating the contents taken from the opened shells without any loss of edible scallop muscle in an economical, rapid and efficient manner. It will be appreciated that the present cleanly and efficiently removes the scallop muscle from the shell without waste, as compared to the manual cutting of the muscle from the shell, wherein some of the muscle remains on the shell.

Preliminary to the shucking operation, provision is made for cleaning and sorting the scallops dredged from the ocean bottom. The contents of the dredge are deposited in the sorting device which is adapted to remove all of the mud and other debris including undersize scallops and to leave only the marketable size scallops which are delivered to the shucking apparatus for processing. In practice, the separating operation lends itself to efficient conservation wherein provision is made for quickly separating the smaller scallops from the larger scallops and to immediately return the small scallops to the sea. Also, the scallops of merchantable size are separated from the empty shells, sand, rocks and both small and large miscellaneous sea life that is brought on deck together with the scallops, the separated scallops being delivered to the shucking apparatus for processing. Because of the speed of separating if done at sea, many of the fish, crabs, snails and other sea life may be returned overboard in condition to live.

In accordance with the present method of shucking shellfish particularly scallops, it has been discovered that the first step in performing the present shucking operation is to subject the scallop to a substantial shock which may be effected in one form of apparatus for practicing the present method by dropping the scallop from a substantial height onto a receiving support. The initial shocking operation does not break or open the shell. However, it does prepare the scallop in some manner, not understood, for the next step in the operation which comprises immersing the scallop in a bath of hot water or subjecting it to another form of heat for a predetermined length of time at a predetermined temperature sufficient to assist in relaxing the scallop muscle and to aid in separating the meat and viscera from the shell during a subsequent operation but not enough to cook the scallop. The next stop in the present method of shucking the scallop is to subject the scallop to a second shocking operation by again dropping the scallop onto a support. This latter operation will effect separation of the two half shells of the bivalve and release of the meat and attached viscera. The shells and the meat may then be guided onto a wide mesh screen conveyer which permits the meats to drop through the mesh onto a second conveyer to be carried to a storage point, and the shells carried on top of the screen conveyer are guided onto a third conveyer for discharge at a suitable storage point. While disposed on the screen, the shells and the meats are subject to a spray of water which assists in causing the meats to pass through the wire mesh.

In a modified form of the present method the second shocking operation is performed by subjecting the scallops to a blow by rotating peddles mounted in a confined space such as a chamber comprising a box open at the bottom so that the scallops are opened and confined by the side walls of the box. The shells are opened, and the shells, released meats and viscera then fall onto an inclined wide mesh screen by which the shells and the scallop meats and viscera are separated. The scallop meats and attached viscera are then delivered to a conveyer having resilient pusher elements which cooperate with an expanded metal plate having an undulating surface or closely spaced projections which effect separation of the viscera from the meat by a novel tearing and pulling or peeling operation to be described.

In still another embodiment of the invention, both shocking operations for initially relaxing the scallop muscles are performed by projecting the scallops against the side wall of a box, the scallops being immersed in a bath of hot water after the first shocking operation. After the second shocking operation, the shell are separated, and the meats and attached visceras fall on an inclined wide mesh screen through which the meats with the viscera attached may pass. The shells which cannot pass through the screen are carried away on a conveyer. The meats and visceras are then delivered to novel apparatus by which the viscera is progressively removed from the meat in a novel and efficient manner, the viscera being discarded and the cleaned scallop meat discharged onto a conveyer leading to a storage receptacle or other desired location for packing.

In a still further embodiment of the invention, the scallops are subjected to centrifugal force which also serves to shock and relax the muscles of the scallops immediately prior to subjecting the scallops to the hot water bath preparatory to a second shocking operation to effect opening of the scallops and separation of the meat from the shells.

Figure 2:
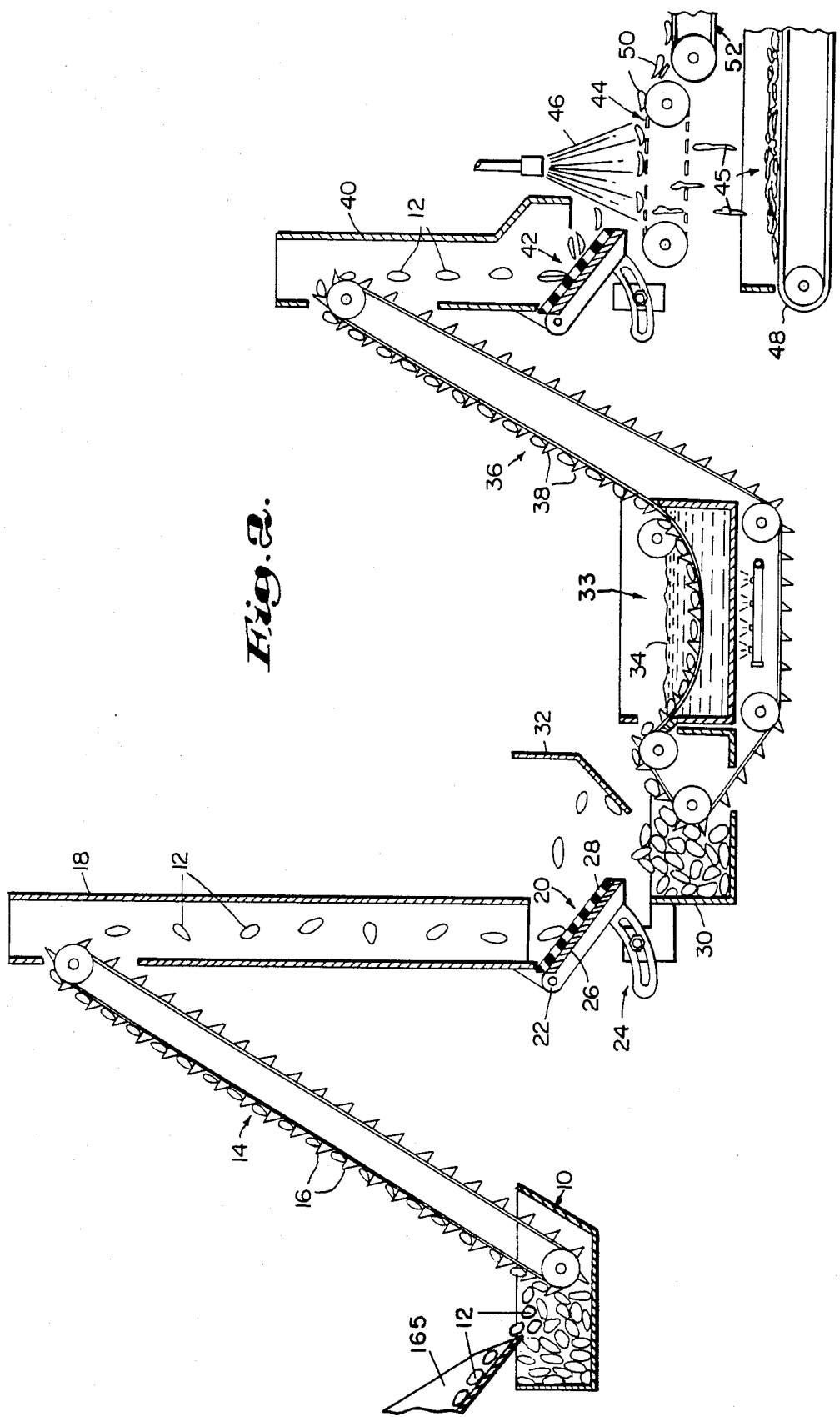
FIG. 2 is a side elevation of apparatus for shucking shellfish in accordance with one form of the present method.

Referring now to the drawings and particularly to FIG. 1, the illustrated apparatus, indicated generally at 150, comprises a preliminary cleaning and sorting device in the form of a separator arranged to receive the contents of a scallop dredge and to clear out the mud, stones, conchs and other debris and also to sort out the undersize scallops from the market size scallops. As herein shown, the separator 150 comprises a cylindrical rotatable cage open at each end and includes a plurality of spaced rods 151, 152 extended between and secured to spoked end supporting hoops 153 and intermediate hoops 154. The spoked hoops are fast on a central shaft 155 supported for rotation in hearing at the upper ends of upright frame members 156, the cage being inclined downwardly as shown. The shaft 155 is arranged to be driven through connections from a motor and speed reducing unit 157 connected to the shaft by a chain and sprocket drive 158. A water spray 159 is directed into the cage from the underside by suitable piping connections indicated at 160, and a water spray 161 directed into the top of the cage may also be provided. The rods 151 extended between the hoops at the upper sections of the cage are spaced apart about one and one-quarter inches, and the rods 152 extended between the hoops at the lower section are spaced apart about two inches. In operation, the contents of the dredge are deposited into the hopper 162 at the upper end of the cage and the mud, small stones and other small debris, together with undersize scallops, are permitted to fall through the one and one-quarter inch spaces between the rods 151 during rotation of the cage and while being subjected to the water spray to be received by a pan 163 and returned to the sea through conduits 164. Large stones, conchs and market size scallops are permitted to pass by gravity into the lower section where the market size scallops may fall through the two-inch spaces between the rods 152, the market size scallops being received in a pan 165 and delivered into a hopper 10, as shown in FIGS. 1 and 2. The larger stones, conchs and other large debris pass out of the open end of the cage to be received by a deflecting pan 166 is guiding the debris back into the sea.

Referring now to FIG. 2 which more or less diagrammatically illustrates a preferred form of apparatus for practicing the present method of shucking scallops, 10 represent a hopper into which the scallops 12 to be shucked are deposited, and 14 represents a conveyer or carrier chain having a plurality of spaced pockets 16 and arranged at a relatively steep incline for carrying a regulated amount of the scallops from the hopper 10 to a substantial height. The scallopss 12 thus elevated are carried over the upper end of the conveyer and are permitted to fall freely through a vertical chute 18 onto an inclined baffle plate 20 disposed at the lower end of the chute. The height of the free fall may vary from 20 to 60 feet depending on the size, shape and condition of the scallops, a preferred height being about 40 feet. The baffle plate 20 may be pivoted at 22 to permit adjustment of the incline by a slot and belt connection 24 as illustrated. The baffle may comprise a metal plate 26 faced with a rubberised or other resilient material 20 of a relatively semirigid character, the object being to effect a relatively sharp blow to the scallop without breaking the shell. Upon striking the semirigid baffle plate 20, the scallops will bounce off the plate and fall into a second hopper 30, as shown, a stationary baffle 32 being provided to guide the scallops into the hopper 30.

The next stop in the present method of shucking scallops is to pass the same through a tank 33 of heated water 34. The scallops are immersed in and transported through the water by a second conveyer or carrier chain 36 also provided with spaced pockets 38 and which is arranged to pick up regulated amounts of scallops from the hopper 30 and carry them through the hot water bath as shown. The water temperature may vary from 150° F. to 212° F. according to variations in the time of immersion, and may also vary with different sizes and shell condition of the scallops, the important consideration being that the time and temperature combination should be insufficient to cook the scallops but sufficient to assist in separating the meat from the shell or to prepare the scallop meats to be separated from the shell during the next step in the method.

At a temperature of 150° F. it is preferred to subject the scallops to the heated water or other form of heat for 20 seconds, and at 212° F. 3 seconds.

In accordance with the preferred form of the invention, the temperature is 180° and the scallops subjected to the heat for 7 seconds. This may vary within reasonable limits, depending upon the condition of the scallops, i.e., whether or not they are substantially clean, covered with barnacles and whether or not the shells are thick or thin.

It will be observed that the upper run of the conveyer or carrier chain 36 extends upwardly from the tank 33 at an incline, the upper end of the conveyer being arranged to release the scallops into the upper end of a second vertical chute 40 to fall freely through the chute onto a second adjustably inclined baffle plate 42 having a rubberised fabric facing of a more or less semirigid consistency. The height of the free fall through the second chute 40 may and preferably will be substantially less than the fall through the first chute, and preferably comprise a twenty-foot drop. This may be varied within reasonable limits. In operation, upon striking the baffle 42, the two half shells come apart, releasing the entire inside of the scallop which is then free from the shells at this point. The shells and the meats then fall or bounce from the inclined baffle onto a relatively wide mesh flexible screen belt 44, the meats 45 pass through the screen to fall onto a discharge conveyer 48, and then carried to a discharge point for further processing wherein the muscle, i.e., the meat of the scallop is separated from the viscera. If desired, a spray of water 46 may be used to assist in washing the meats through the screen. The shells 50 do not pass through the screen and are carried on top of the screen conveyer 44 and are transferred to a second discharge conveyer 52 to be carried to a storage point.

From the description thus far it will be seen that the present method of and apparatus for shucking shellfish of the bivalve type contemplates a first shocking operation by dropping the bivalves from a predetermined height onto a plate or other support. This operation is believed to relax the muscle connecting the half shells of the bivalve without opening or breaking the shell; then passing the shucked bivalve through a heating medium, herein illustrated as being a hot water bath, to further relax the bivalve; and then subjecting the bivalve to a second shucking operation by again dropping the bivalve from a predetermined height to strike a plate which effects opening of the bivalve and separation of the two half shells and release of the meat from the shells. It will be understood that instead of passing through a bath of hot water, as shown, the shellfish may be subjected to other forms of regulated heat.

Figure 3:
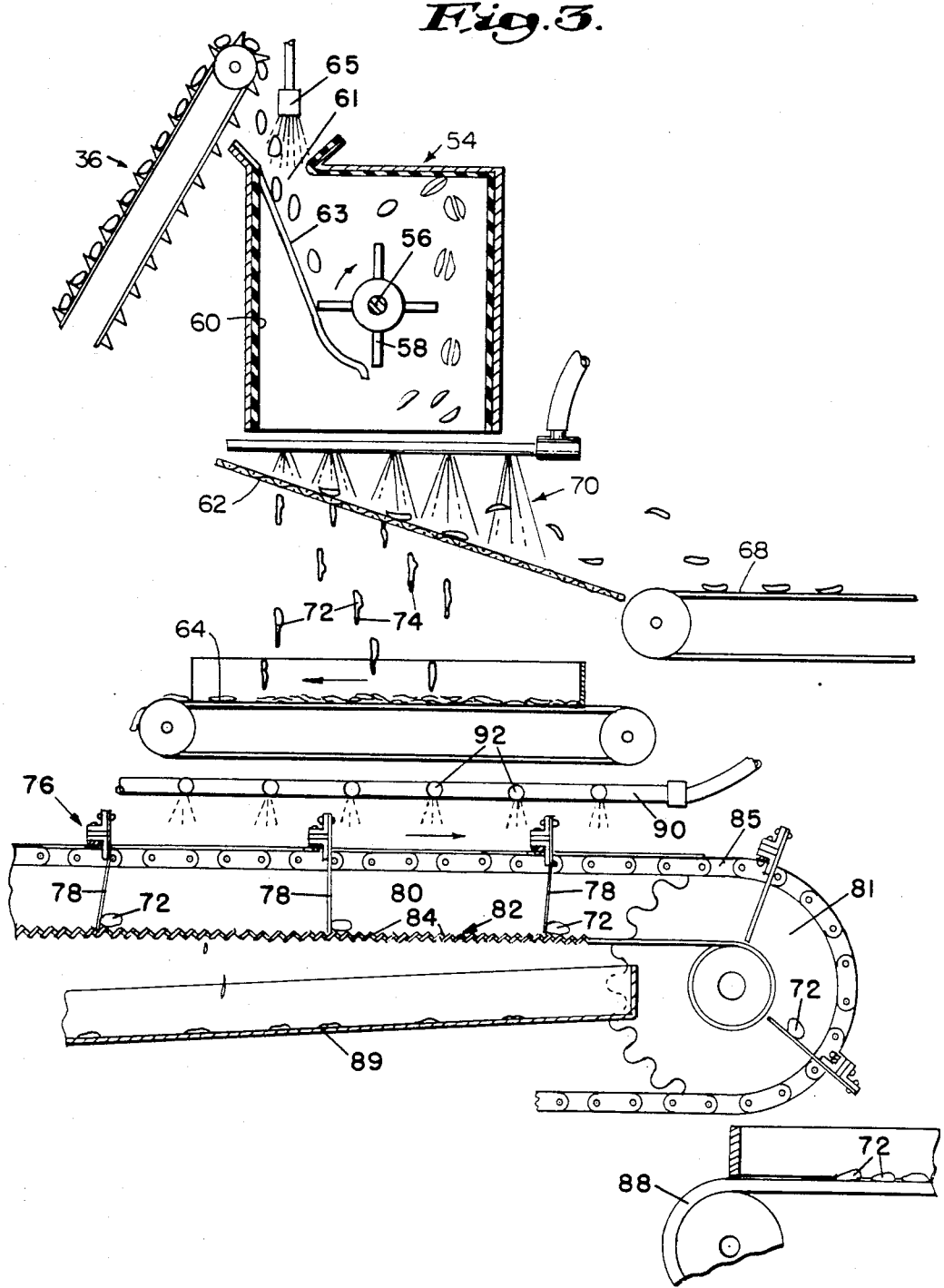
FIG. 3 is a side elevation of a modified form of a portion of the apparatus shown in FIG. 2 and including apparatus for removing the viscera from the meat.

As illustrated in FIG. 3, in a modified form of apparatus for practicing the present invention, the scallops, after being subjected to a first shocking operation and immersed in a hot water bath may be dropped into chamber 54 having one or more rotary shafts 56 provided with flexible paddles 58 which are arranged to strike the still intact scallops and throw them against the resilient walls 60 of the chamber whereby each scallop receives a sharp blow during the passage through the chamber. This casuses the shells of the scallops to open and to separate into two half shells, the remaining contents of the shells, including the meats and viscera, being released from the shells. In order to prevent breakage of the shells, the flexible paddles 58 may comprise rubber covered chains or the like, and the interior of the walls of the chamber may also be faced with a rubberised fabric as indicated at 60. The scallops enter the chamber through an upper opening 61 and are guided into engagement with the paddles by a guide plate 63. A water spray 65 is provided at the opening 61, as shown, to wash the scallops as they enter the interior of the chamber. The opened scallops, shells and contents then fall on a wide mesh inclined screen 62 through which the scallop meats pass to be received on a conveyer 64. A water spray 70 is provided beneath the chamber to wash the scallop meats and the shells. The half shells are too large to pass through the screen 62, and, therefore, bounce or fall down the surface of the inclined screen onto a discharge conveyer 68 as shown.

In accordance with this form of the invention the chamber 54 is preferably of an inside diameter $24'' \times 32'' \times 32''$ deep, and the paddles 10'' in length. The paddles are arranged to be driven from 400 to 600 RPM, and preferably at 500 RPM.

Referring now to FIG. 4 illustrating another form of apparatus for practicing the present method, the scallops 100 deposited into a container 102 are elevated by a conveyer 104 which delivers the scallops into a first shocking chamber 106 which may comprise a container lined with a semirigid resilient material 108 having an opening 110 in its upper end and an opening 112 in its lower end. A rotary paddle wheel 114 mounted in the chamber is arranged to pick up the scallops and to throw them into engagement with the front wall of the chamber. The front wall 116 may be V-shaped in plan as shown in FIG. 5.

In this form of the invention the chamber 106 is preferably $24'' \times 36'' \times 24''$ deep, and the paddles are preferably $11\frac{1}{2}''$ in length. The paddles may be rotated from 400 to 600 RPM, and preferably at 500 RPM .

The scallops after passing through the first shocking chamber 106 still intact through the opening 112 into a hot water bath 118 and are then elevated by a conveyer 120 to be delivered to a second shocking chamber 122 which may comprise a lined container, similar to the chamber 54 as shown in FIG. 2. As herein shown, the chamber 122 is provided with a set of flexible paddles 58 arranged to strike the scallops guided thereto by a plate 63 to cause them to be opened by the blow of the paddles or as they strike a wall of the chamber. This second shocking operation causes the scallop shells to come apart and to cause the scallop meats to separate free of the shells. The scallops and the shells fall through the open bottom of the chamber onto an inclined wide mesh screen 62, the half shells being guided to a discharge conveyer 68, and the scallop meat and attached viscera passes through the screen to fall onto conveyer 64. A water spray 70 is used to keep the screen free and clear of viscera. The conveyer 64 is arranged to deposit the scallop meat into eviscerating apparatus 76 to be more fully described.

It will be understood that the dimensions of the chamber 122, the paddles and RPM's will preferably be the same as these described in connection with the form of the invention illustrated in FIG. 3.

A further modification of the shocking apparatus is shown in FIGS. 9 and 10 wherein the scallops are delivered from a supply thereof by the conveyer 14 into a rotary impeller 168 designed to shock the scallops by the action of centrifual force before delivering them directly into a hot water bath 170 as shown. The rotary impeller 168 comprises a disk $\frac{1}{4}''$ thick having an outside diameter of 35'' mounted on a shaft and arranged to be rotated from 400 to 600 RPM, and perferably at 500 RPM and, as herein shown, is provided with a plurality of blades 172 which are preferably 8'' long and 4'' deep. The impeller is enclosed within a stationary casing 174 having an inside diameter of 36'' and an inside width of $8\frac{1}{2}''$ and having an opening 176 in a side wall 177 thereof for receiving the scallop and an opening 178 in the annular wall of the casing 174 through which the scallops may fall or be projected directly into the hot water bath 170. As illustrated, the scallops are carried through the hot water bath by a flight conveyer 180 arranged to run over sprockets 182, 184, the flights being guided through a conduit 186 as illustrated. It will be understood that after passing through the bath the scallops may be delivered either to the vertical chute 40, as shown in FIG. 2, or to the chamber 54, as shown in FIG. 3, for continued processing as described. In practice, the speed of the conveyer 180 is timed to cause the scallops to be immersed in the hot water or subjected to another form of heat for about seven seconds. After passing through the hot water bath the scallops are subjected to further treatment to cause the shells to come apart and the meat separated from the shells as herein described.

The scallop meats 72 and attached viscera 74 are delivered by the conveyer 64 into eviscerating apparatus indicated generally at 76. The eviscerating apparatus comprises an elongated stationary expanded metal plate 82 supported by single irons 79 mounted between side frames 83 and upon which the meats and attached viscera are deposited. A plurality of spaced, flexible plates 78 carried by spaced endless chains 80 mounted on sprockets 81 are arraged to be driven by a suitable motor, not shown, which together with the metal plate 82 form moving compartments. The chains run in channels 85 formed by angle irons 87 mounted on frame 83 as shown. The free ends of the flexible pusher plates 78 are arranged to cooperate with the perforated expanded metal plate 82 which has an undulated irregular surface providing closely spaced projections 84 over which the free ends of the flexible pusher plates 78 intermittently jump from valley to valley as they are carried by chains 80 along over the surface of the stationary plate 82.

Figure 6:
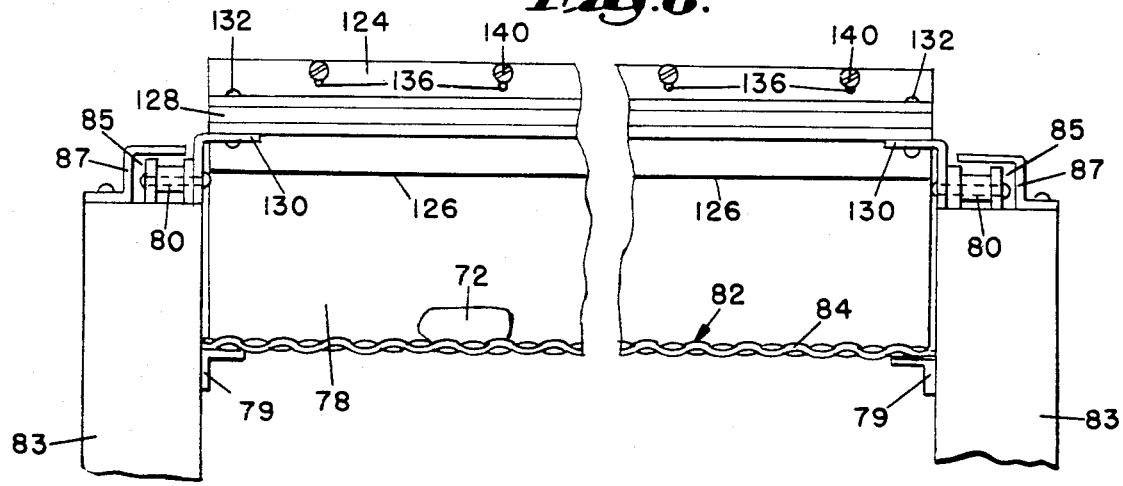
FIG. 6 is an end view in cross section taken on the line 6—6 of FIG. 4.
Figure 7:
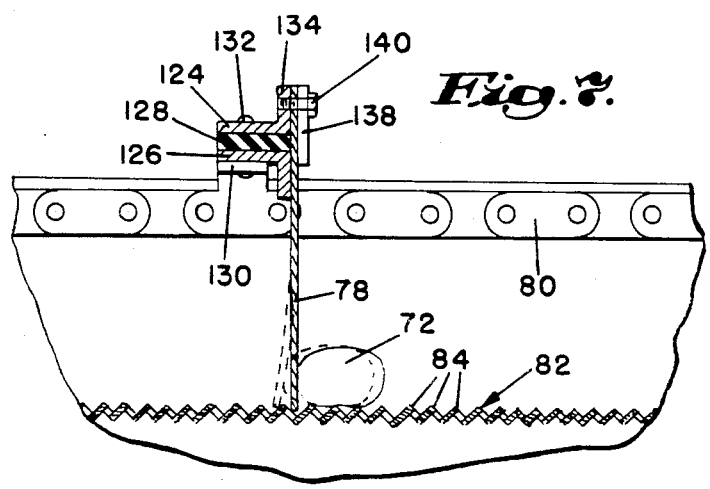
FIG. 7 is an enlarged detail view of a portion of the apparatus for removing the viscera from the meat.
Figure 8:
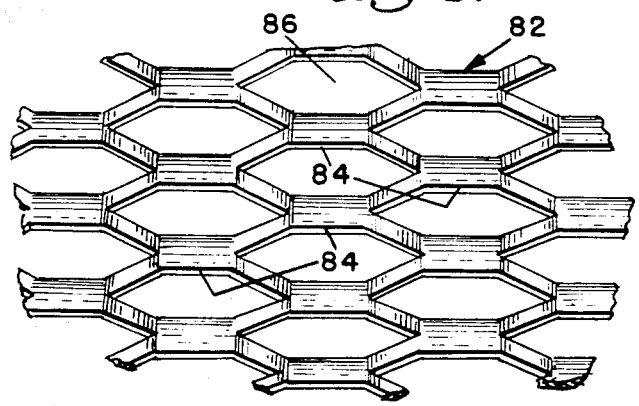
FIG. 8 is an enlarged detail view illustrating the screen utilized in removing the viscera from the meat.

As illustrated in detail in FIGS. 6 and 7, each flexible pusher plate 78 is supported at its upper end by a pair of opposed angle bars 124, 126 having a layer or resilient material 128 inserted therebetween. The horizontal legs of the angle bars and the intervening resilient material are connected together and to a lateral extension 130 from one of the chain links 80 by a belt 132. The vertical leg of the upper angle bar 124 is provided with a plurality of spaced threaded openings 134, and the upper edge of the plate 78 is provided with slots 136 aligned with threaded openings. The plate 78 is also provided with a retaining bar 138. As thus constructed, the plate 78 is adjustably secured to the upper angle bar by bolts 140 which pass through the retaining bar 138, slot 136 and into the threaded opening 134. In practice, the flexible plate 78 is adjusted vertically so that the lower end thereof extends below the high points or projections 84 of the expanded metal plate 82 as shown. In practice, the pusher plate is held against the expanded metal under tension.

In operation, a plurality of meats and attached viscera are delivered by the conveyer 64 into successive compartments onto the metal plate 82 and in front of a moving pusher plate 78 and are engaged by the pusher plate 78 and subjected to successive intermittent impacts by the moving plates as the plates jump across the peaks of the projections 84. The meats and viscera tumble across the peaks of the projections 84 on the surface of the expanded metal plate 82. As illustrated in FIGS. 4, 6 and 7, during the tumbling action the viscera tends to fall through the openings 86 in the expanded metal plate, and portions of the viscera are caught and pinched by the edge of the pusher plate 78 against parts of the metal plate 82, and during the intermittent jumping of the pusher plate, successive portions of the viscera are torn or severed from the scallop meats as the scallops are urged by the impact of the plate across the surface of the expanded metal plate 82. As a result of this intermittent impact and pinching action, substantially all of the viscera is progressively removed from the meats by the time the plates reach the end of the run across the expanded metal plate. The removed viscera falls through the openings in the expanded metal plate to be discharged onto an inclined chute 89. The cleaned meats are discharged onto a conveyer 88, see FIG. 3, and delivered to the inspection and packing table. In order to assist in causing portions of the viscera to sag down into the openings in the expanded metal plate, a water manifold 90 having a series of spray nozzles 92 is provided above the surface of the expanded metal plate. The finishing end of the expanded metal plate may be made of expanded metal of a smaller mesh and may be subjected to a voluminous water spray whereby the scallops are separated from the cartilage next to the muscle and also the sane vein.

In accordance with this form of the invention it will be understood that the maximum speed of movement of the pusher plates across the metal plate driven by the endless chains 80 is 60 ft. per minute, and the minimum speed is 3 ft. per minute, and the preferred speed is 30 ft. per minute.

FIG. 11 illustrates a modified form of apparatus for eviscerating the scallop meats delivered thereto from the conveyer 64. As herein shown, the modified form of eviscerating apparatus comprises a series of contiguous rollers 200 which are geared together so that adjacent rollers rotate in opposite directions. As illustrated, the end roller is connected by a chain and sprocket drive 202 to a reversing motor 204, and in practice the rollers are rotated in one direction for one and one-half seconds and are then reversed in rotation for one and one-half seconds, adjacent rollers rotating in opposite directions. The apparatus is arranged at an incline, as shown, and is also provided with a water spray 206 disposed above the rollers and a water spray 208 disposed below the rollers as shown. The rollers may comprise metal having an embossed plastic covering of a nature such as to grip the viscera without damage to the scallop meat. In operation, the scallops delivered by the conveyer 64 fall onto a guide plate 210 which presents the scallops into the valley between the first set of rollers. Assuming that the first pair of adjacent rollers 200 are rotating in the direction of the arrows, the soft viscera is gripped between the rollers to, in effect, peel or sever the viscera from the meat. The viscera is received by a inclined discharge pan 212. Now, when the first pair of rollers 200 reverse their direction, the scallops will be released by the rollers and will move along into the next adjacent valley or the following valley between the rollers to be again subjected to an eviscerating operation when the rollers are rotated toward each other. During the eviscerating operation the scallop meat or muscle is being rotated or turned over so that all parts of the muscle is denuded of viscera as the scallop muscle is progressively advanced to different pairs of adjacent rollers. As a result, when the scallop meats reach the delivery end of the eviscerator, the scallop meats will completely cleaned. The eviscerated scallops are delivered to a conveyer 214 to be carried to the inspection and packing room. Each roller 200 is provided with a flexible wiper 216 engagable with the underside thereof, as illustrated, to prevent the removed viscera from sticking to the rollers and carried around to the next adjacent roller.

FIG. 11a illustrates a modified form of the eviscerating apparatus shown in FIG. 11 wherein the rollers are arranged to be rotated in the same direction and with or without reversal. In this embodiment of the invention the series of rollers are arranged in a line, and the first roller 200a of successive adjacent pair of rollers may have an embossed plastic covering to effect gripping of the viscera of the scallop meat, and the second roller 200b of successive pairs of adjacent rollers may have a smooth surface. In practice, the rollers 200a are arranged to rotate at about 20% more speed than the rollers 200b. However, in practice one of two rollers.

In operation when the scallop meats are deposited in the valley between the first pair of rollers 200a and 200b, the soft viscera is pulled by the embossed roller 200a against the frictional resistance of the slower moving 200b to tear the viscera from the scallop meats and pass the viscera downwardly between the two rollers. The viscera thus removed is scraped off the rollers by the flexible wipers 216a to fall onto the discharge pan. The modified apparatus is also provided with water sprays 206a and 208a disposed above and below the rollers, respectively, s shown.

During the continued operation of the eviscerating apparatus shown in FIG. 11a, the scallop meats deposited in the valley between the first pair of rollers are released when the particular portion or portions of the viscera engaged by the rollers are torn away whereupon the scallop meats are advanced by the rotation of the rollers to pass into the adjacent valley and then into the following valley where portions of the remaining viscera are similarly torn away from the meats. This operation continues from one pair of rollers to another until the scallop meats are completely denuded whereupon they are discharged to be delivered to the inspection and packing room.

While one or more of the rollers has been described as having an embossed surface, they both may have a smooth surface.

It will be understood that the outside diameter of the rollers illustrated in FIG. 11 and 11a is 1⅝", and the speed of the rotation of the rollers may be from 12 RPM to 1200 RPM. However, 30 RPM is preferred.

In a further modified form of shocking apparatus, illustrated in FIG. 12, the heated scallops are delivered are delivered onto an inclined guide plate 220 to present successive scallops between a pair of resilient rollers 222 arranged to be rotated at a sufficiently high rate of speed so as to grip and then propel the scallops onto a baffle plate 224, each of the scallops being propelled in substantially the same direction, and as each scallop strike the baffle it moves away from the baffle in order to prevent the scallops from piling up on the baffle and also to prevent breakage. The rollers may comprise a resilient foam rubber material 226 covered with a heavy duty neoprene 228. The baffle plate 234 may be covered with a semirigid rubber facing 225 of a character such as to absorb some of the striking force to avoid breaking the shell. The baffle plate is adjustable angularly as shown.

In operation, the resilient rollers 222 will yield, as illustrated, to grip the scallop therebetween, and when the scallop is released, it is projected with considerable force against the baffle plate 224 to cause the shells to come apart and to free the meat from the shells. The shells and the meats, together with the viscera, bounce or pass by gravity onto a wide mesh screen 230 through which the viscera may pass to be received on a belt 232 which delivers the scallops onto an inclined guide plate 334, from which the scallops are discharged into the eviscerating apparatus shown in FIG. 3, or the eviscerating apparatus shown in FIG. 11. A water spray 236 is also provided to assist in passing the meats and the viscera through the screen. The shells pass across the screen by gravity onto a discharge belt 238.

In another form of the invention the apparatus for performing the first and second shocking operations may comprise the rollers 222 as illustrated in FIG. 12.

It will be understood that the rollers 222 each have an outside diameter of 11½" and are driven from 400 to 600 RPM, and preferably at 500 RPM.

While the present invention has been described as requiring a first and a second shocking operation, it will be understood that the first shocking operation may be eliminated and the scallops first subjected to heat in the manner heretofore described and then conveyed to the rollers 222 or other shocking means for opening the shells and then carried to either type of eviscerating apparatus described to be cleaned.

From the foregoing description it will be apparent that the present invention provided a novel method and apparatus for shocking shellfish and scallops in particular, whereby the shellfish may be opened and cleaned in a highly efficient manner such that the production of edible shellfish is substantially increased.

While the present description has been for the purpose of illustration and not by way of limitation restricted to the method and apparatus for shocking scallops, it will be understood that other bivalves may be shucked in accordance with the present invention.

Having thus described the invention, what is claimed is:

1. An aparatus for extracting the adductor muscle from other components of scallops, said apparatus comprising:
   (a) means for separating scallop shells from scallop flesh, the flesh comprising the adductor muscles and viscera attached thereto,
   (b) an eviscerator for removing the viscera from the adductor muscles of the scallop flesh after the shells have been separated from the scallop flesh by the separating means, said eviscerator having an input end and an output end,
   (c) means for transporting the scallop flesh, without the shells, from the separating means to the input end of the eviscerator,
   (d) said eviscerator comprising at least one pair of rollers aligned in parallel adjacent relationship to provide a nip between adjacent rollers, each roller in each said pair of rollers having a surface that is roughened so as to facilitate gripping of viscera in the nip between adjacent rollers, said rollers defining a path of travel for the scallop flesh from the input end of said eviscerator to the output end thereof, positive drive means connected to each pair of rollers for nonfrictionally driving each pair of rollers so that the upper portions of said rollers in each pair are alternately (1) rotated towards each other to pinch and pull viscera downwardly through the nip of said rollers and retain the scallop muscles on the upper surface of said rollers, thereby to tear viscera away from the muscles, and (2) rotated away from each other, whereby the viscera are removed from the muscles as the muscles move over the upper surfaces of said rollers from said input end to said output end of said eviscerator.

2. The apparatus of claim 1 in which said eviscerator comprises a plurality of pairs of rollers aligned transversely to the path of the scallop flesh from said input end of said eviscerator to said ouptut end thereof, said path descending from said input end to said output end.

3. The apparatus defined in claim 1 including spray means positioned above said eviscerator for directing fluid under pressure at the muscles.

* * * * *